(12) United States Patent
Hoke et al.

(10) Patent No.: US 10,597,082 B2
(45) Date of Patent: Mar. 24, 2020

(54) BRACKET FOR IMPROVED IMPACT LOADING PERFORMANCE

(71) Applicant: FORD GLOBAL TECHNOLOGIES, LLC, Dearborn, MI (US)

(72) Inventors: Paul Bryan Hoke, Plymouth, MI (US); Li Lu, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 14/752,021

(22) Filed: Jun. 26, 2015

(65) Prior Publication Data

US 2016/0375937 A1 Dec. 29, 2016

(51) Int. Cl.
*B62D 21/15* (2006.01)
*B62D 27/02* (2006.01)
*B62D 25/00* (2006.01)

(52) U.S. Cl.
CPC ............ *B62D 21/15* (2013.01); *B62D 25/00* (2013.01); *B62D 27/023* (2013.01)

(58) Field of Classification Search
CPC ....... B62D 21/15; B62D 25/00; B62D 27/023
USPC .............. 296/187.03, 187.08, 187.09, 187.1, 296/187.11, 187.12; 293/132, 133
See application file for complete search history.

(56) References Cited

U.S. PATENT DOCUMENTS

| | | | |
|---|---|---|---|
| 3,376,947 A | 4/1968 | Barenyi et al. | |
| 4,057,263 A * | 11/1977 | Schwuchow | B62D 21/152 280/797 |
| 5,427,411 A | 6/1995 | Iwasaki et al. | |
| 6,029,765 A * | 2/2000 | Chou | B60K 5/1216 180/292 |
| 6,422,783 B1 | 7/2002 | Jordan | |
| 7,637,562 B2 * | 12/2009 | Andre | B60Q 1/0491 296/193.09 |
| 8,764,091 B2 | 7/2014 | Clark et al. | |
| 8,985,630 B2 * | 3/2015 | Sangha | B62D 27/065 280/124.109 |
| 9,200,417 B2 * | 12/2015 | Leonhardt | E01F 15/0423 |
| 2007/0080531 A1 | 4/2007 | Min | |
| 2007/0164586 A1 | 7/2007 | Erlingfors et al. | |
| 2010/0078149 A1 * | 4/2010 | Yoshimitsu | B60K 11/04 165/67 |
| 2012/0286543 A1 | 11/2012 | Lee | |

(Continued)

FOREIGN PATENT DOCUMENTS

| | | |
|---|---|---|
| CN | 103318260 A | 9/2013 |
| EP | 2049382 A1 | 4/2009 |
| JP | 2013082362 A | 5/2013 |

OTHER PUBLICATIONS

English machine translation for JP2013082362.
(Continued)

*Primary Examiner* — Joseph D. Pape
(74) *Attorney, Agent, or Firm* — David Coppiellie; King & Schickli, PLLC

(57) ABSTRACT

A bracket for a vehicle is provided including a four-way fastener locator portion and a slip plane portion. The fastener locator portion includes a cross-member configured to allow passage therethrough of a portion of a fastener received in the fastener-receiving portion on application of a force meeting or exceeding a predetermined impact load. Assemblies including the provided bracket are described.

19 Claims, 3 Drawing Sheets

(56) References Cited

U.S. PATENT DOCUMENTS

2014/0145132 A1    5/2014  Leiohardt et al.
2015/0021891 A1    1/2015  Sangha et al.
2015/0321635 A1*  11/2015  Luckett ................ B60R 21/215
                                                    280/728.3

OTHER PUBLICATIONS

English Machine Translation of CN103318260A dated Sep. 25, 2013.
English Translation of Notification of First Office Action dated Sep. 4, 2019 for CN Application No. 2016104604226 filed Jun. 22, 2016.

* cited by examiner

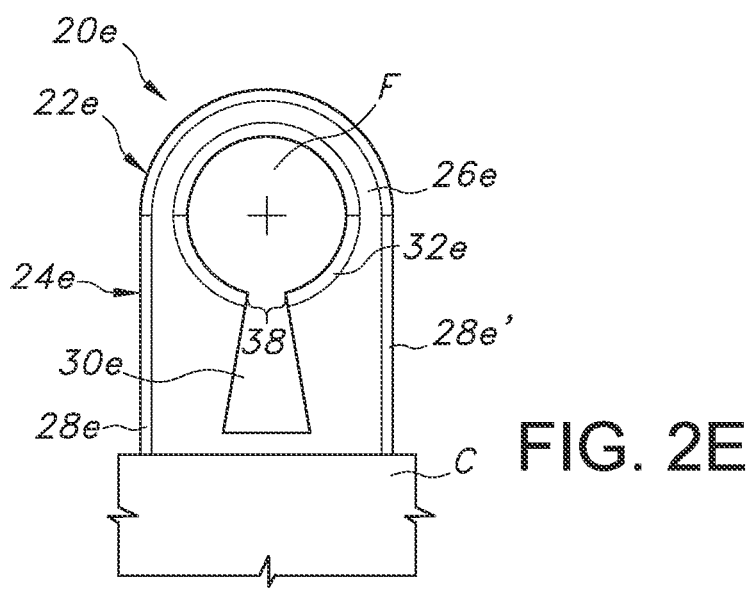
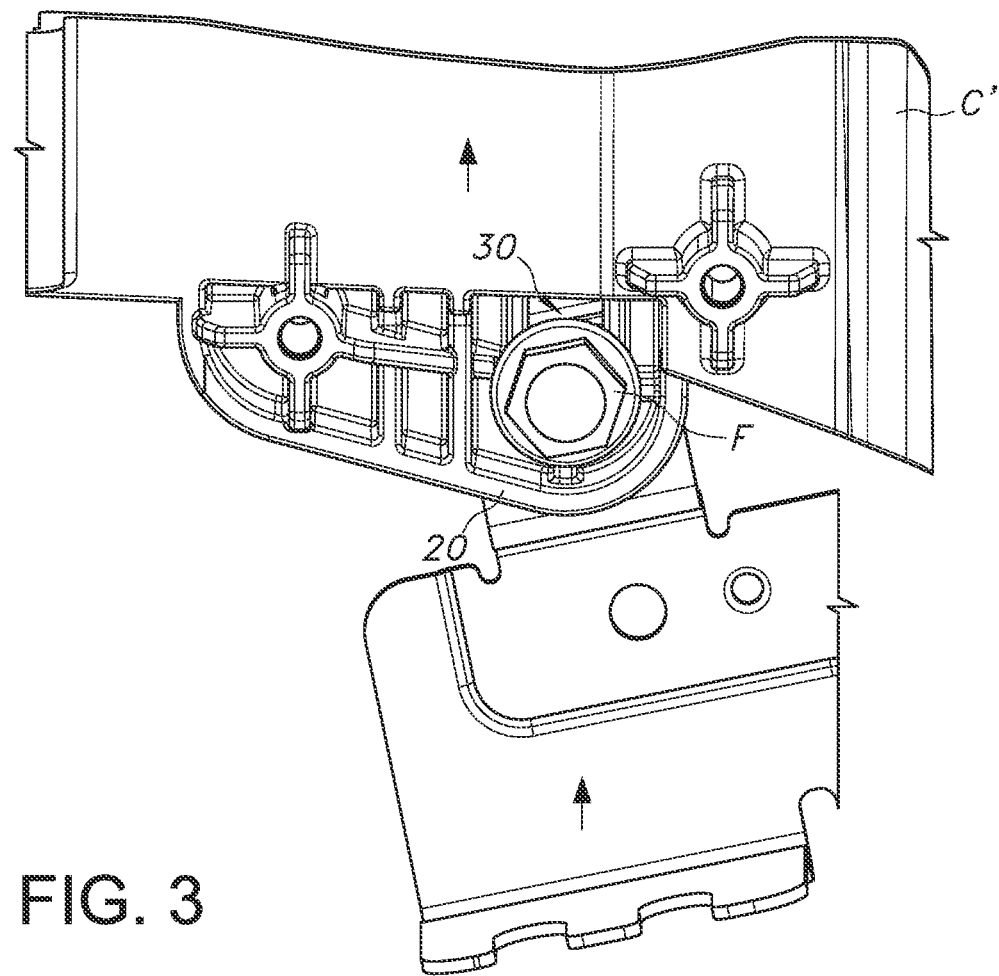

BRACKET FOR IMPROVED IMPACT LOADING PERFORMANCE

TECHNICAL FIELD

This disclosure relates generally to brackets for motor vehicle components, and more particularly to bracket exhibiting improved impact loading performance.

BACKGROUND

Safety regulations dictate, in the event of an impact such as a motor vehicle collision, that the amount of force/energy transmitted to the vehicle occupant's body cannot exceed a predetermined level in order to minimize the risk and/or severity of injury to the occupant. One way this is accomplished is to provide specific crumple zones in vehicle modules/panels, which absorb a portion of the energy of impact. Another way is to provide specific impact loading specifications, i.e., areas and structural features of the motor vehicle which are designed to fail at a predetermined impact load in order to mitigate and reduce the level of impact force transmitted to the occupant. In particular, it is known to provide brackets designed to fail at a predetermined impact load to accomplish this goal.

However, motor vehicle brackets and fasteners must meet certain durability/assembly requirements. For example, brackets and fasteners must be designed not to fail below preset limits, and also are often required to include design features which assist in alignment of the particular vehicle components which they secure. As an example, with reference to FIGS. 1A and 1B, conventional molded or cast bracket structures 10 for securing vehicle components (generically depicted as C, C') one to another typically include a fastener locator portion 12 designed to auto-locate a fastener F such as a bolt or screw in a desired orientation for securing the bracket to a vehicle component. Conventional brackets 10 also typically include a solid body 14 which may optionally include one or more strengthening rib structures 16 to provide further stability and strength to the bracket. As depicted, bracket 10 is integral to the structure of vehicle component C, but the skilled artisan will readily appreciate that the bracket 10 may equally be a separately cast or molded piece. Because the bracket 10 presents a unitary body aligning the fastener locator portion 12 with a cooperating aperture 18 in a cooperating bracket structure 19 on an adjoining component C', vehicle components C, C' are rigidly secured to one another and there is no mitigation of impact force unless the bracket 10 completely fails and/or one or both of components C, C' crumple or crush in the event of a collision.

With reference to FIG. 1C, another prior art bracket 10' is shown which is designed to provide some impact force mitigation. The bracket 10' includes a fastener F locator portion 12' and a slip plane portion 18. In the depicted bracket, a two-way fastener locator portion 15 is provided by an arcuate top bracket edge. Arms 16', 16' depend from the top edge. The space 19 between the top edge and component C is substantially open. As will be appreciated, in the event of a direct or indirectly transmitted impact to component C, an impact load will be transmitted in the direction of fastener F (see arrow). As will be appreciated, this causes bracket 10' and fastener F to function as a slip joint providing a certain degree of slippage on impact. The impact load at which the attachment between fastener F and the top edge will slip through space 19 is determined by fastener F clamping force. It is therefore very difficult to provide a precisely controlled slip plane which will slip only at a desired impact load. Moreover, over time and with the vibration encountered during vehicle use, fastener F may loosen resulting in noise, component vibration, etc.

Other bracket design options which are designed to reduce the impact forces transmitted by vehicle components/modules to lessen/mitigate risk and/or severity of injury can result in poorly secured or misaligned vehicle components, poor tactile "feel" of the vehicle to the vehicle user, noise issues such as squeaking/rattling, excessive vibration, etc. This can create customer dissatisfaction with vehicle quality, fit, and finish. On the other hand, brackets/fasteners which strengthen such areas may cause impact forces to a vehicle occupant to exceed desired levels. Thus, designing brackets and other attachments which are sufficiently durable, which provide other desirable features such as fastener location, but which are also designed to fail at a predetermined impact load presents a significant engineering challenge.

To satisfy this identified need in the art, the present disclosure describes a bracket for securing vehicle components/modules one to another. The described bracket includes suitable fastener locator structures, provides a durable structure providing a secure attachment of components during ordinary use, but is also designed to slip at a predetermined impact load in order to reduce the impact forces transmitted in the event of a collision. Advantageously, the bracket includes a slip plane portion providing a slip joint feature designed to cause joint or connection point slippage at a predetermined impact load. This slip joint feature is advantageous, in that the bracket on receiving a predetermined impact will slip rather than completely failing, providing an impact absorbing function without completely releasing the connection between the components. The described bracket further includes a "tunable" portion which allows the designer to increase or decrease the predetermined impact load which will cause the bracket to slip.

SUMMARY

In accordance with the purposes and benefits described herein, in one aspect a bracket is provided including a body having at least a fastener locator portion and a slip plane portion. The slip plane portion is designed to fail at a predetermined impact load, thus allowing a certain degree of slippage of a connection between vehicle components on impact to absorb a portion of the impact force.

In embodiments, the slip plane portion is tunable, that is, may be manufactured to fail/rupture at a higher or a lower impact force according to desired or required properties for the bracket such as durability, vibration transmission, and others. In still other embodiments, elements of the slip plane portion may be designed to focus impact load in a desired direction.

In the following description, there are shown and described embodiments of the disclosed bracket. As it should be realized, the bracket is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of a fascia attachment system for securing a vehicle fascia and/or components thereof to other vehicle components or to the structural architecture of a vehicle, for example a vehicle bolster, and together with the description serve to explain certain principles thereof. In the drawing:

FIG. 2E depicts still another alternative embodiment of the bracket of FIG. 2A; and FIG. 3 depicts vehicle components attached to one another by a bracket according to the present disclosure.

Figure 1A:
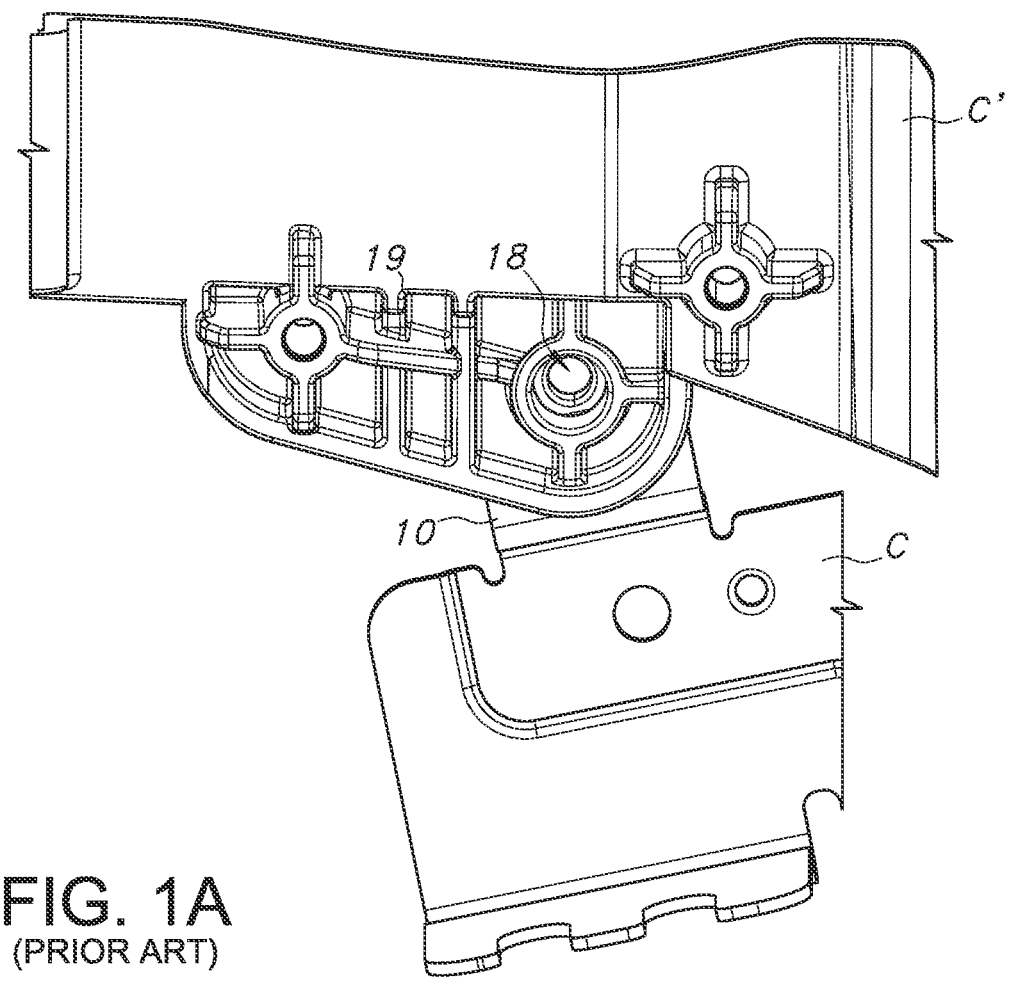
FIG. 1A depicts a prior art bracket system securing vehicle components to one another.
Figure 1B:
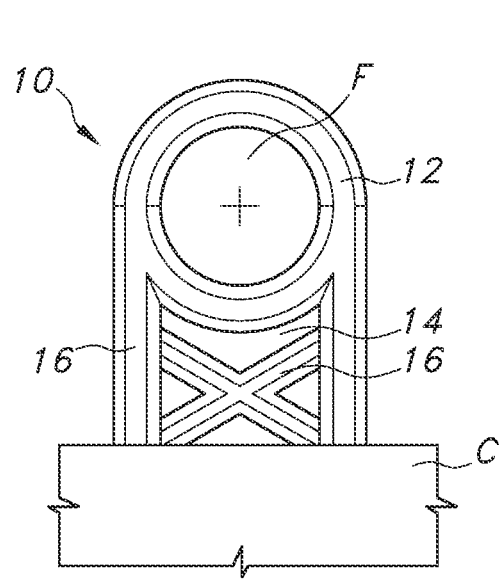
FIG. 1B depicts a prior art bracket for use in the system of FIG. 1A.

Reference will now be made in detail to embodiments of the disclosed bracket, examples of which are illustrated in the accompanying drawing figures.

DETAILED DESCRIPTION

To solve the aforementioned and other problems, the present disclosure at a high level relates to a bracket comprising at least a fastener locator portion and a slip plane portion. In the drawings, like features are numbered with like reference numerals but distinguished by reference letters (a,b,c, . . . n, etc.). As is known, a number of suitable materials for manufacturing such brackets are known in the art, including metals, alloys, polymers such as glass-filled polypropylene (30%), plastics, and others. However, any suitable material for fabricating/molding brackets according to the present description is contemplated. Accordingly, any such descriptions should not be taken to be limiting in any way.

Figure 1C:
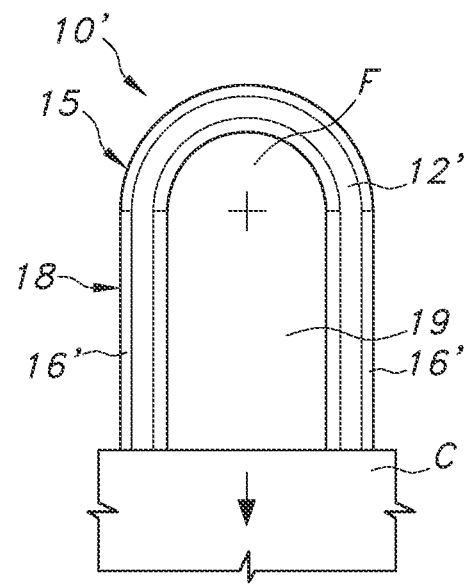
FIG. 1C depicts another prior art bracket for use in the system of FIG. 1A.

As summarized above in the discussion of FIG. 1C, use only of a friction/interference fit between a fastener F and a bracket to provide a slip plane is suboptimal, because providing a slip plane that will slip at a precise desired impact load is nearly impossible, since the slip plane relies only on bolt clamping force. Therefore, to solve this problem a bracket 20a is provided (see FIG. 2A) including a fastener F locator portion 22a and a slip plane portion 24a. As shown, locator portion 22a is defined by a top edge 26a and a tunable cross-member 32a which cooperate to define a four-way fastener locator portion 22a. As will be appreciated, by "tunable" it is meant that a thickness and/or a configuration of cross-member 32a may be altered to provide a cross-member that will rupture only on application of a force equaling or exceeding a predetermined impact load to allow slippage of a fastener F along arms 28a, 28a' and into open area 30a. Thus, a more precisely definable slip joint is provided.

Still other configurations are possible and contemplated herein. FIG. 2B shows another alternative embodiment of a bracket 20b including a fastener F four-way locator portion 22b and a slip plane portion 24b defined by a top edge 26b and a tunable cross-member 32b. As shown, cross-member 32b is configured whereby space 30b defines a pentagonal configuration, with the apex 34 of the pentagon and so the narrowest portion of cross-member 32b being adjacent to the aperture defined to receive fastener F. As described for FIG. 2A, a thickness of this portion may be altered as desired to provide a cross-member 32b that will rupture only on application of a force equaling or exceeding a predetermined impact load. In the depicted embodiment, depending arms 28b, 28b' also include stress risers 36, 36', which are cutouts defined in the material of arms 28b, 28b' that by their shape and placement focus impact stress in a vertical load direction.

Figure 2A:
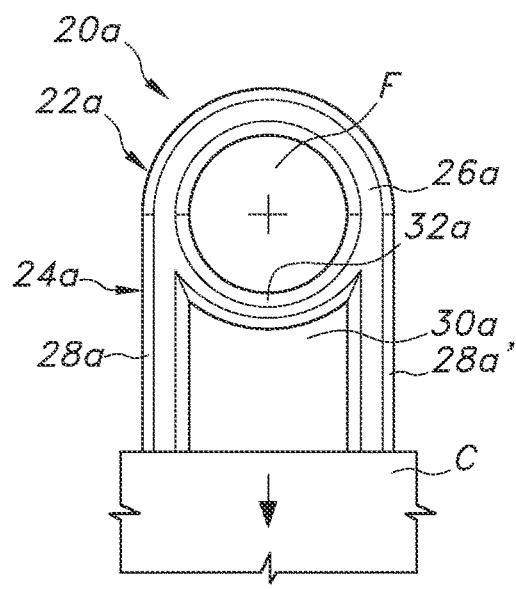
FIG. 2A depicts an embodiment of a bracket according to the present disclosure.
Figure 2B:
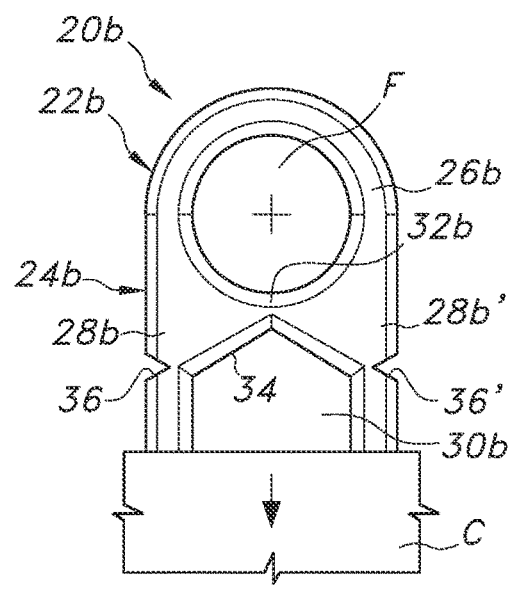
FIG. 2B depicts an alternative embodiment of the bracket of FIG. 2A.
Figure 2C:
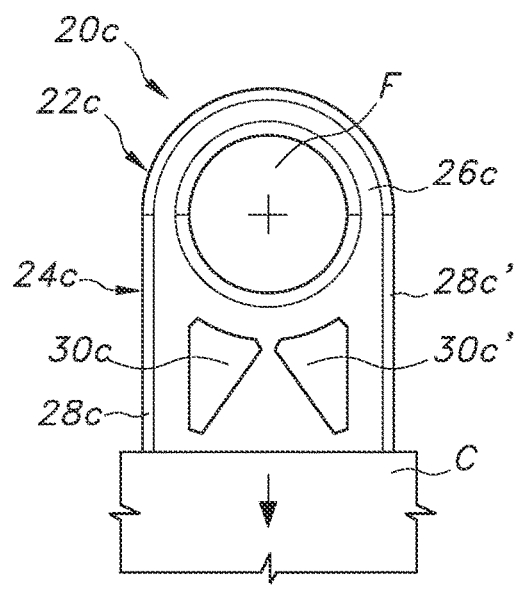
FIG. 2C depicts another alternative embodiment of the bracket of FIG. 2A.

FIG. 2C shows yet another alternative embodiment of a bracket 20c including a fastener F locator portion 22c and a slip plane portion 24c. In this embodiment, rather than a single open space defined in bracket 20c between cross-member 32c and component C, two open spaces 30c, 30c' are provided. As will be appreciated, this bracket embodiment is closer in configuration to a solid bracket, and so could be considered for implementation in situations where a more robust bracket is required to provide slippage only on application of a greater impact load.

Figure 2D:
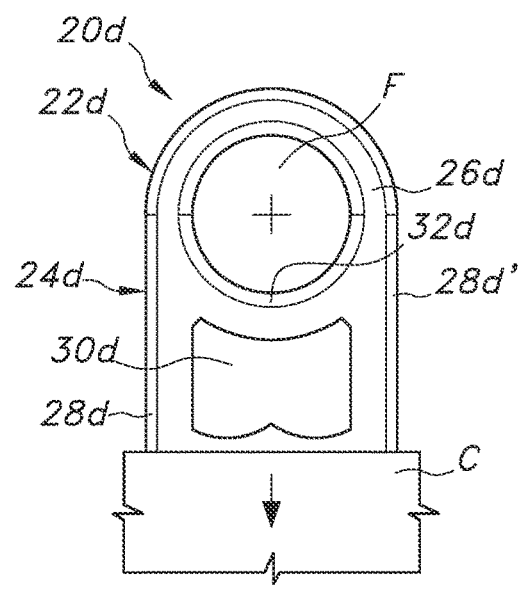
FIG. 2D depicts yet another alternative embodiment of the bracket of FIG. 2A.

FIG. 2D shows still another alternative embodiment of a bracket 20d including a fastener F locator portion 22d and a slip plane portion 24d. Here, cross-member 32d defines a greater thickness dimension than, for example bracket 20a of FIG. 2A, and so a more robust bracket 20d is described requiring a greater impact load in order to provide a slip joint function.

FIG. 2E shows still yet another alternative embodiment of a bracket 20e including a fastener F locator portion 22e and a slip plane portion 24e. As shown, rather than a closed cross-member 32 as depicted for the embodiments of FIGS. 2A-2D, a portion of cross-member 32e is open, and a "keyhole" or substantially triangular configuration is provided to open space 30e. That is, a gap 38 is defined at a bottom portion of the aperture defined for fastener F. As will be appreciated, on application of an impact force directly or indirectly to component C, fastener F will slip through gap 38 and a slip joint will be provided whereby component C will be allowed to slip in the direction of the depicted arrow. By providing a gap 38 of a predetermined width dimension, it is possible to narrowly define the impact load that will cause the described slippage.

FIG. 3 depicts vehicle components C, C' secured to one another by a fastener F using a bracket 20 according to the present disclosure. As described above, a direct or indirect impact to component C will impart an impact force to bracket 20 in the direction of the depicted arrows. By use of the brackets 20 as described above, it is possible to narrowly define a predetermined impact load that will cause the bracket 20 to function as a slip joint, i.e. to provide the described slippage along open space 30 and so absorb a portion of the force of impact.

Thus, by the foregoing descriptions it will be appreciated that a bracket is provided including a four-way fastener locator allowing precise positioning of a fastener and also of vehicle components fastened thereby. In turn, the described brackets provide also the advantage of a slip joint allowing slippage at a desired impact load, allowing peak loads at impact to be mitigated/reduced.

Obvious modifications and variations are possible in light of the above teachings. All such modifications and variations are within the scope of the appended claims when interpreted in accordance with the breadth to which they are fairly, legally and equitably entitled.

What is claimed:

1. A bracket for a vehicle, comprising:
   a fastener locator portion; and a slip plane portion;
the fastener locator portion including a tunable cross-member adapted to rupture upon application of a force meeting or exceeding a predetermined impact load wherein said predetermined impact load is selectively altered upon selection of a thickness or shape of said tunable cross-member.

2. The bracket of claim 1, wherein the fastener locator portion is a four-way locator defined by an arcuate circumference configured to receive and orient a fastener therethrough.

3. The bracket of claim 1, wherein the cross-member includes a portion having a thickness dimension configured to rupture on application of the force.

4. The bracket of claim 1, wherein the cross-member includes a gap configured to allow a portion of a fastener to pass therethrough on application of the force.

5. The bracket of claim 1, wherein the slip plane portion includes one or more arms depending from the fastener locator portion.

6. The bracket of claim 5, wherein the one or more arms include one or more stress risers for focusing the predetermined load along a vertical axis of the bracket.

7. A vehicle including the bracket of claim 1.

8. An assembly, comprising:
a first component; and
a second component;
the first component and the second component being connected at a slip joint defined by one or more brackets each comprising a fastener locator portion and a slip plane portion, the fastener locator portion including a tunable cross-member adapted to rupture, upon application of a force meeting or exceeding a predetermined impact load wherein said predetermined impact load is selectively altered upon selection of a thickness or shape of said tunable cross-member, and thereby allow passage of a portion of a fastener received in the fastener locator portion, and wherein the fastener locator portion is a four-way locator defined by an arcuate circumference configured to receive and orient a fastener therethrough.

9. The assembly of claim 8, wherein the cross-member includes a portion having a thickness dimension configured to rupture on application of the force.

10. The assembly of claim 8, wherein the cross-member includes a gap configured to allow a portion of a fastener to pass therethrough on application of the force.

11. The assembly of claim 8, wherein the slip plane portion includes one or more arms depending from the fastener locator portion.

12. The assembly of claim 11, wherein the one or more arms include one or more stress risers for focusing the predetermined load along a vertical axis of the bracket.

13. A vehicle including the assembly of claim 8.

14. An impact-absorbing assembly, comprising:
a first component; and
a second component;
the first component and the second component being connected at a slip joint defined by one or more cooperating fasteners and brackets, each bracket comprising a fastener four-way locator portion and a slip plane portion, the fastener four-way locator portion including a tunable cross-member adapted to rupture, upon application of a force meeting or exceeding a predetermined impact load wherein said predetermined impact load is selectively altered upon selection of a thickness or shape of said tunable cross-member, and thereby allow passage of a portion of a fastener received in the fastener four-way locator portion only on application of a force meeting or exceeding a predetermined impact load.

15. The assembly of claim 14, wherein the cross-member includes a portion having a thickness dimension configured to rupture on application of the force.

16. The assembly of claim 14, wherein the cross-member includes a gap configured to allow a portion of a fastener to pass therethrough on application of the force.

17. The assembly of claim 14, wherein the slip plane portion includes one or more arms depending from the fastener locator portion.

18. The assembly of claim 17, wherein the one or more arms include one or more stress risers for focusing the predetermined load along a vertical axis of the bracket.

19. A vehicle including the assembly of claim 14.

* * * * *